June 8, 1965 J. H. APITZ 3,187,456
ICE FISHING TIP-UP
Filed June 6, 1962 2 Sheets-Sheet 1
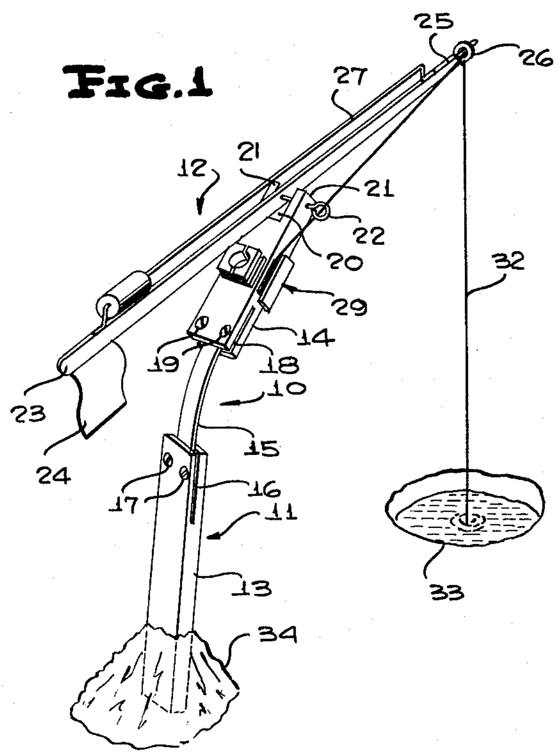
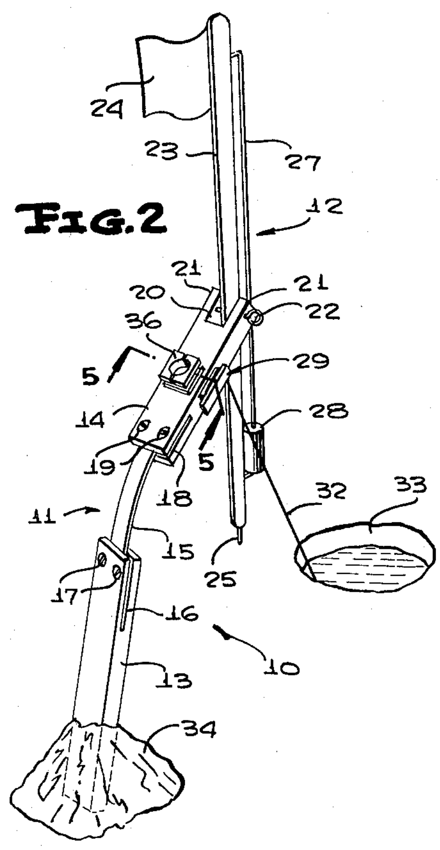
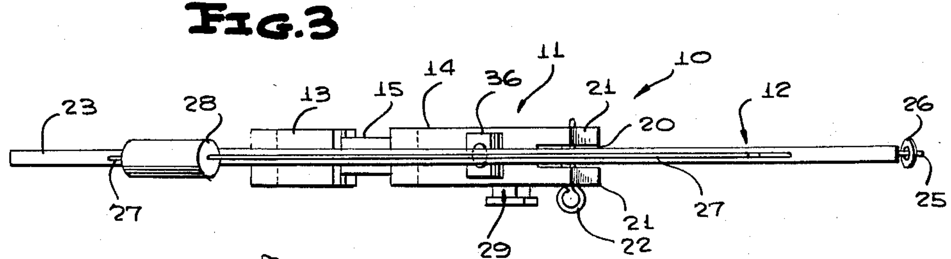
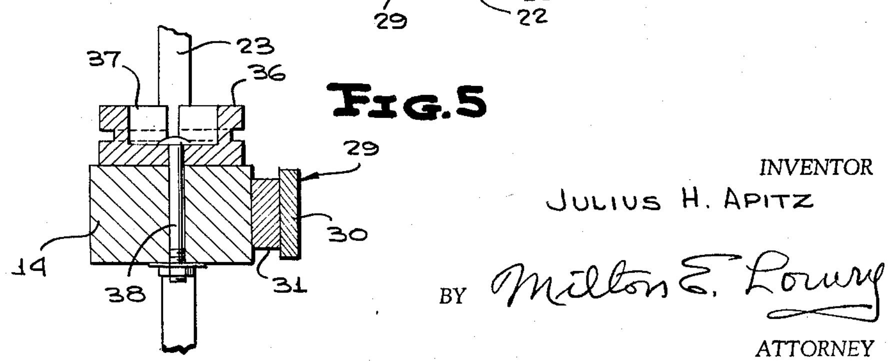
INVENTOR
JULIUS H. APITZ
BY Milton E. Lowry
ATTORNEY ICE FISHING TIP-UP
Filed June 6, 1962 2 Sheets-Sheet 2
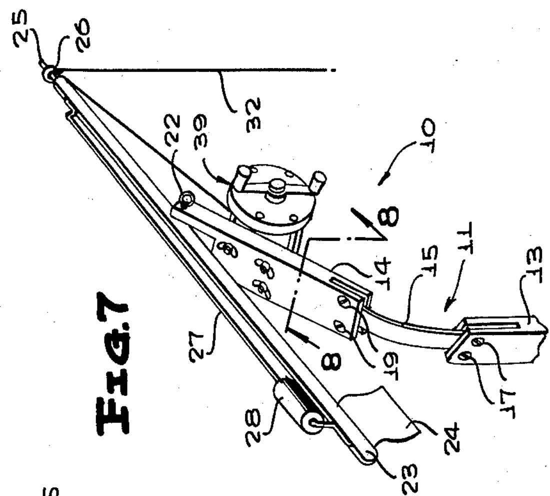
FIG. 8
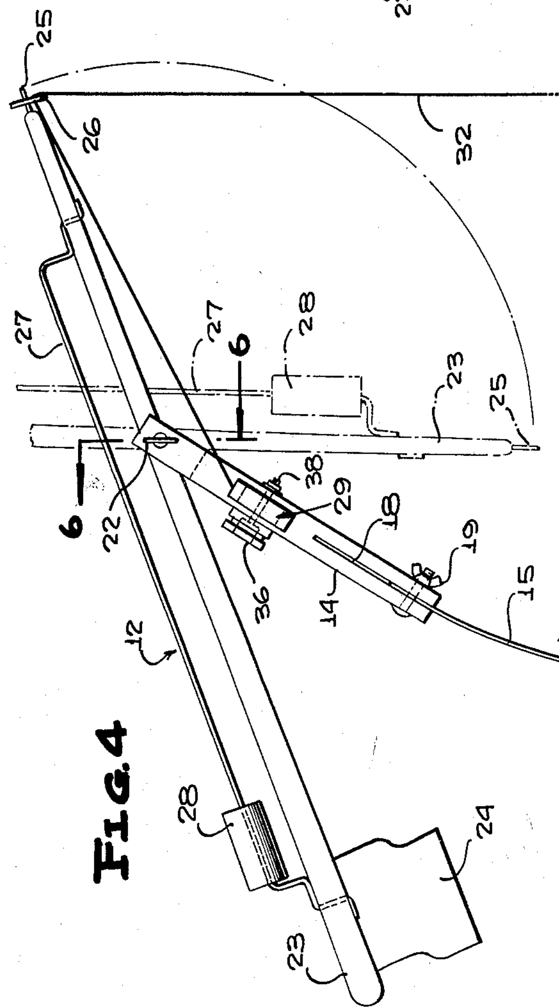
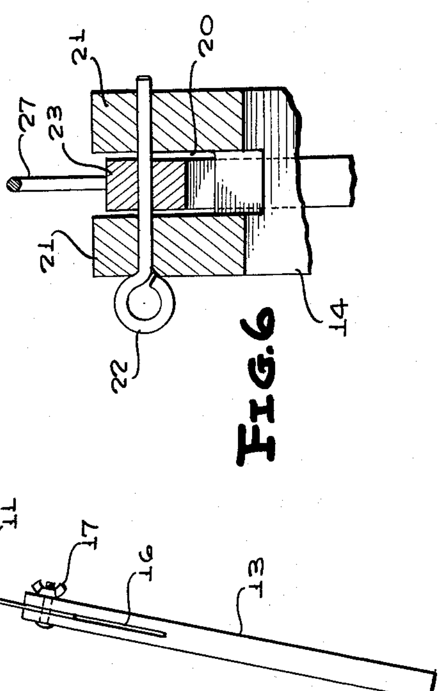
INVENTOR
JULIUS H. APITZ
BY Milton E. Powers
ATTORNEY United States Patent Office 3,187,456 Patented June 8, 1965

3,187,456

ICE FISHING TIP-UP

Julius H. Apitz, 525 E. Carroll, Appleton, Wis.

Filed June 6, 1962, Ser. No. 200,544
3 Claims. (Cl. 43—17)

This invention relates in general to new and useful improvements in fishing equipment, and more specifically to a novel tip-up device for ice fishing.

A primary object of this invention is to provide a novel support for a tip-up member of an ice fishing device wherein the support is provided with a resilient intermediate part so that wind acting upon the tip-up device will effect a swinging motion thereof, with this motion being transmitted to the attached fishing line and providing the necessary movement of the bait carried by the fishing line.

Another object of this invention is to provide a novel support for mounting a tip-up member of a tip-up device for ice fishing, the support including a lower support member and an upper support member, the two support members being connected together by an intermediate resilient connector, the connector being adjustably secured to at least one of the support members whereby the effective length of the connector may be varied so as to vary the resiliency thereof, whereby the effect of wind on the tip-up device may be varied.

Another object of this invention is to provide a novel support for a tip-up member of a tip-up fishing device, the support being provided with a suitable fishing line holder whereby the attachment of a fishing line to the support may be facilitated.

With the above and other objects in view that will hereinafter appear, the nature of the invention will be more clearly understood by reference to the following detailed description, the appended claims and the several views illustrated in the accompanying drawing:

In the drawing:

FIGURE 1 is a perspective view of the tip-up device formed in accordance with this invention, and shows the same in use.

FIGURE 2 is a perspective view similar to FIGURE 1 and shows the tip-up device after a strike has been made.

FIGURE 3 is a plan view of the tip-up device of FIGURE 1 and shows further the specific details thereof.

FIGURE 4 is an enlarged side elevational view of the tip-up device, and shows more specifically the structural details thereof, the tip-up member of the device being shown in an upright strike indicating position in phantom lines.

FIGURE 5 is an enlarged fragmentary transverse vertical sectional view taken along the line 5—5 of FIGURE 2 and shows specifically the details of a line holder and a fishing hook holder carried by the support.

FIGURE 6 is an enlarged fragmentary vertical sectional view taken along the line 6—6 of FIGURE 4 and shows the specific manner in which the tip-up member of the device is mounted for pivotal movement with respect to the support.

FIGURE 7 is a fragmentary perspective view similar to FIGURE 1 and shows the support with a modified form of fishing line holder.

FIGURE 8 is an enlarged fragmentary generally vertical sectional view taken along the line 8—8 of FIGURE 7 and shows the specific mounting of the fishing line holder of FIGURE 7 on the support.

Referring now to the drawings in detail, it will be seen that there is illustrated the tip-up device which is the subject of this invention, the tip-up device being generally referred to by the numeral 10. The tip-up device 10 is formed of two major components which include a support, generally referred to by the numeral 11, and a tip-up member, generally referred to by the numeral 12.

The support 11 includes a lower support member 13 and an upper support member 14. The two support members 13 and 14 are simply short lengths of board having generally square cut ends.

The support members 13 and 14 are connected together by a resilient intermediate connector 15. The connector 15 is in the form of an elongated spring metal strap. The upper end of the lower support member 13 is provided with an elongated slit 16 in which the lower end of the connector 15 is seated. The upper end portion of the lower support member 13 is provided with a pair of fasteners 17 disposed on opposite sides of the connector 15 for clamping the surrounding portions of the lower support member 13 around the connector 15 and thus retain the connector 15 in an adjusted position with respect to the lower support member 13.

The lower end of the upper support member 14 is formed in the same general manner as is the upper end of the lower support member 13. The upper support member 14 lower end is provided with an elongated slit 18 in which the upper end of the connector 15 is telescoped. A pair of fasteners 19 extends through the lower portion of the upper support member 14 on opposite sides of the connector 15 so as to clamp the connector 15 in an adjusted position within the upper support member 14.

It will be readily apparent that the resiliency of the connector 15 will vary with the length thereof. By adjusting the amount of the connector 15 which is disposed within the slits 16 and 18, it will be readily apparent that the resiliency of the connection between the support members 13 and 14 may be readily varied.

The upper end of the upper support member 14 is bifurcated to form an opening 20 defined by a pair of side portions 21. A removable pin 22 extends through the side portions 21 and across the opening 20.

The tip-up member 12 is pivotally mounted on the pin 22 and includes an elongated rod 23 through which the pin 22 passes. The rod 23 is generally seated in the notch or opening 20.

At the upper end of the rod 23, a flag 24 is disposed. The opposite end of the rod 23 has a pin 25 projecting axially therefrom. The pin 25 removably supports a fishing line carrying ring 26 which is utilized in a manner to be described hereinafter.

The rod 23 also carries an elongated guide rod 27. A sliding weight 28 is mounted on the guide rod 27 for movement in accordance with the tilting of the tip-up member 12 so as to retain the tip-up member 12 in a last placed position.

The upper support member 14 is provided with a fishing line holder 29. The fishing line holder 29, as is best shown in FIGURE 5, is in the form of a block having an enlarged outer portion 30 and a reduced inner portion 31. In the use of the tip-up device 10, a fishing line 32 is wound around the fishing line holder 29 and is passed therefrom to and through the ring 26. The fishing line 32 then is passed downwardly through an opening 33 formed in the ice through which the fishing takes place. Suitable hook and bait means are carried by the lower end of the fishing line 32, these not being shown.

In forming the opening 33 in the ice, the ice removed in the forming of the opening, which ice is referred to by the numeral 34, is collected. With the support 11 being disposed in a generally upright position, and with the lower end of the lower support member 13 firmly engaged with the ice, the removed ice particles 34 are packed around the lower end of the lower support member 13 in the manner shown in FIGURE 1. When the ice 34 freezes solid, it firmly anchors the support 11.

Due to the resiliency of the connector 15, it will be readily apparent that the normal wind found blowing across the ice in the wintertime will have an effect on the tip-up device 10. The wind will react on the tip-up member 12 and the upper support member 14 and effect a swaying thereof. This swaying motion will be transmitted to the fishing line 32 and provide the necessary agitating movement of the bait carried by the fishing line 32. It is to be understood that the swaying and otherwise movement of the fishing line 32 will be controlled by the resiliency of the connector 15, which resiliency may be varied by varying the effective length of the connector 15 in the manner described hereinbefore.

The tip-up member 12 is normally in the position illustrated in FIGURE 1. However, when there is a strike on the bait carried by the fishing line 32, the strike will pull down on the fishing line 32 with the result that the pin 25 will be pulled down and the rod 23 will be tilted at a reverse angle to that shown in FIGURE 1. As this tilting of the rod 23 momentarily occurs, the weight 38 will slide down the guide wire 27 and cause the tip-up member 12 to assume a vertical position, such as that shown in FIGURE 2. At the same time, the ring 26 will slide off of the pin 25, but will remain on the fishing line 32. The flag 24 is now disposed uppermost, and signals to the fisherman that a strike has been made.

At this time, it is pointed out that the resiliency of the connector 15 will also serve in setting the hook carried by the fishing line in the fish, due to the resiliency thereof. When the strike is made, the fish will run with the fishing line 32 until it is stopped by the anchored end thereof. There will be momentarily a bending of the connector 15, after which the connector 15 will exert a return pull to fishing line 32 so as to set the hook.

The upper support member 14 is also provided with a fishhook holder 36. The fishhook holder 36 is in the form of a hollowed-out block having a central opening 37 for receiving hooks. The fishhook holder 36 is secured to the upper support member 14 by means of a bolt 38.

Reference is now made to FIGURES 7 and 8 wherein the upper support member 14 is provided with a modified form of fish line holder. In lieu of the simple fish line holder 29, a customary fishing reel, generally referred to by the numeral 39, is secured to the underside of the upper support member 14. The usually mounting bracket 40 of the fishing reel 39 is provided with suitable fasteners 41 which pass through the upper support member 14 and thus releasably secure the fishing line reel 39 to the upper support member 14.

Although preferred embodiments of the invention have been illustrated and described herein, it is to be understood that other minor modifications may be made in the invention, within the scope and spirit thereof, as defined in the appended claims.

I claim:

1. A tip-up device for ice fishing comprising a support and a tip-up member pivotally carried by said support, said support including a lower support member adapted to be supported in an upright position on ice, a straight substantially vertically directed upper support member having a pivotal support for said tip-up member, at the upper end thereof, and a resilent intermediate connector extending between and connecting together said support member whereby the effects of the wind on said upper support member and said tip-up member may be imparted to an attached fishing line and lure, said connector being adjustably telescoped in at least one of said support members to vary the resiliency thereof, said tip-up member including an elongated rod having a flag at one end, a pin projecting from the opposite end of said rod, a fishing line receiving ring on the pin, a fishing line passing through the ring and adapted to pivot the tip-up member, a sliding weight carried by the rod, and a fishing line holder mounted on said upper support member.

2. The tip-up device of claim 1 wherein the pivoted support for the tip-up member is a removable pin passed through side portions of the upper support and through the tip-up member seated in an opening defined by said side portions.

3. The tip-up device of claim 2 wherein the connector has upper and lower support members with slits in confronting ends thereof and an elongated spring metal strap member having opposite ends thereof received in slits of the upper and lower support member and adjustably secured in said slits by fasteners.

References Cited by the Examiner

UNITED STATES PATENTS

| | | | |
|---|---|---|---|
| 449,202 | 3/91 | Bushong | 43—17 |
| 962,309 | 6/10 | Butler | 43—17 |
| 1,212,388 | 1/17 | Ojerholm | 43—17 |
| 1,451,124 | 4/23 | Stolze | 43—16 |
| 1,464,623 | 8/23 | Lybeck | 43—4.5 |
| 2,564,840 | 8/51 | Glenn. | |
| 2,653,405 | 9/53 | Monahan | 43—16 |
| 2,684,509 | 7/54 | Couturier | 43—17 XR |
| 2,752,716 | 7/56 | Porter | 43—16 |
| 2,773,326 | 12/56 | Calvert | 43—16 |
| 2,802,293 | 8/57 | Flye | 43—25.2 |
| 2,924,038 | 2/60 | Dahlgren | 32—16 |
| 3,005,280 | 10/61 | Vang | 43—4.5 |

FOREIGN PATENTS

| | | |
|---|---|---|
| 112,983 | 1/45 | Sweden. |

ABRAHAM G. STONE, *Primary Examiner.*

JOSEPH S. REICH, *Examiner.*